US00RE39309E

(19) United States
(12) Reissued Patent
McNamara

(10) Patent Number: US RE39,309 E
(45) Date of Reissued Patent: Oct. 3, 2006

(54) BAFFLE FOR DEEP FRYER HEAT EXCHANGER

(76) Inventor: Albert Charles McNamara, 302 Spencer La., San Antonio, TX (US) 78201

(21) Appl. No.: 10/072,001

(22) Filed: Feb. 8, 2002

Related U.S. Patent Documents

Reissue of:
(64) Patent No.: 5,901,641
Issued: May 11, 1999
Appl. No.: 09/184,719
Filed: Nov. 2, 1998

(51) Int. Cl.
*A47J 37/00* (2006.01)
*A47J 37/12* (2006.01)

(52) U.S. Cl. ..... 99/403; 99/330; 99/375; 126/391.1

(58) Field of Classification Search ..... 99/403, 99/337, 332, 325–334, 404–410; 126/345, 126/375.1, 378.1, 92 R, 92 AC, 390.1, 357.1, 126/360.1, 360.2, 91 R; 210/167, DIG. 8; 165/109.1, 174, 185, 177; 219/492, 497, 219/506, 508, 442, 483, 486, 570, 512; 340/589; 426/231, 233, 438, 519, 305, 808, 302; 431/326, 431/170; 138/38, 42; 121/280
See application file for complete search history.

(56) References Cited

U.S. PATENT DOCUMENTS

| | | | | | |
|---|---|---|---|---|---|
| 1,056,373 | A | | 3/1913 | Segelken | |
| 1,496,509 | A | | 6/1924 | Abell | |
| 2,359,288 | A | | 10/1944 | Brinen | |
| 2,688,986 | A | | 9/1954 | O'Brien | |
| 2,691,991 | A | | 10/1954 | Schutt | |
| 3,769,959 | A | | 11/1973 | Parker | |
| 4,106,558 | A | | 8/1978 | Neveux | |
| 4,228,730 | A | * | 10/1980 | Schindler et al. | 99/407 |
| 4,372,980 | A | * | 2/1983 | Luebke et al. | 426/231 |
| 4,639,213 | A | * | 1/1987 | Simpson | 431/326 |
| 4,660,542 | A | * | 4/1987 | Scherer | 99/403 |
| 4,684,412 | A | * | 8/1987 | Fritzsche | 99/330 X |
| 4,848,318 | A | * | 7/1989 | Brewer | 126/390 |
| 4,913,041 | A | * | 4/1990 | Taber et al. | 126/391 |

(Continued)

FOREIGN PATENT DOCUMENTS

| | | |
|---|---|---|
| DE | 8507002 | 7/1985 |
| GB | 1042465 | 9/1966 |

OTHER PUBLICATIONS

"Gas Immersion Tubes for Deep Fat Fryers," Research in Fundamentals of Immersion Tube Heating with Gas, Research Bulletin No. 24, AGA Testing Labs, pp. 20–21 (1944).*
Fig. 13 from the Ashrae Handbook, Fundamentals, p. 3.16 (1993).*
Pitco Deep Fryer Baffles (Photos).
Dean Fryer Baffle.

*Primary Examiner*—Timothy F. Simone
(74) *Attorney, Agent, or Firm*—Mark H. Miller; Jackson Walker L.L.P.

(57) ABSTRACT

A heat exchanger for a fryer system has at least one heat transfer conduit having heating fluid passing therethrough. A baffle plate is disposed in the heat transfer conduit, defining a plane and having a first surface, an opposed second surface, and a longitudinal axis which divides the baffle plate into a first portion and a second portion. A plurality of tabs, each having a longitudinal axis, extend outwardly from the baffle plate. A crease is defined along the intersection of each tab and the plate. At least one tab is positioned in the first portion of the baffle plate and at least one tab is positioned in the second portion of the baffle plate. Webs separate adjacent tabs from one another in a direction substantially perpendicular to the longitudinal axis of the tabs. In certain embodiments, the crease of at least one tab forms an acute angle with a longitudinal edge of the baffle plate.

39 Claims, 6 Drawing Sheets

U.S. PATENT DOCUMENTS 4,923,705 A * 5/1990 Mottur et al. ..... 429/438 X
5,185,168 A * 2/1993 Takahashi ..... 426/233
5,209,218 A * 5/1993 Daneshvar et al. ..... 99/403 X
5,417,202 A * 5/1995 Cote ..... 99/403 X
5,490,449 A * 2/1996 Meister et al. ..... 99/403
5,706,717 A * 1/1998 Barner ..... 99/330
5,746,195 A * 5/1998 Codazzi et al. ..... 126/391

* cited by examiner

BAFFLE FOR DEEP FRYER HEAT EXCHANGER

Matter enclosed in heavy brackets [ ] appears in the original patent but forms no part of this reissue specification; matter printed in italics indicates the additions made by reissue.

INTRODUCTION

The present invention relates to a deep fryer, and more particularly, to an improved baffle for a deep fryer heat exchanger.

BACKGROUND OF THE INVENTION

Deep fryers are commercially used by restaurants, institutional kitchens, and fast food establishments for cooking a variety of food products, such as french fries, fish, fried chicken, and the like. The food product is cooked by totally immersing it within a vat or tank that is filled with heated oil or shortening. The oil may be heated using a flow of heated gas that is forced or drawn through a heat exchanger having flow passages that are located within or external to the cooking vat. A gas burner is provided to heat the gas circulating within the heat exchanger. Baffles, such as spiral baffles and disc baffles, have been known to be provided within the flow passages of heat exchangers to increase the turbulent flow of gas and enhance heat transfer.

It is an object of the present invention to provide a baffle for a deep fryer which reduces or wholly overcomes some or all of the difficulties inherent in prior known devices. Particular objects and advantages of the invention will be apparent to those skilled in the art, that is, those who are knowledgeable or experienced in this field of technology, in view of the following disclosure of the invention and detailed description of certain preferred embodiments.

SUMMARY OF THE INVENTION

The principles of the invention may be used to advantage to provide a baffle for the heat exchanger of a fryer system which can improve the heat transfer from heated gas flowing through heat transfer conduits of the heat exchanger to shortening contained within a vat.

In accordance with a first aspect, a heat exchanger for a fryer system has at least one heat transfer conduit having a heating fluid passing therethrough. A baffle plate is disposed within the at least one heat transfer conduit and defines a plane. The baffle plate has a first surface, an opposed second surface, and a longitudinal axis dividing the baffle plate into a first portion and a second portion. Each of a plurality of tabs has a longitudinal axis and extends outwardly away from one of the first and second surfaces. The intersection of the tab and the baffle plate defines a crease. At least one of the tabs is positioned in the first portion of the baffle plate and at least one of the tabs is positioned in the second portion of the baffle plate. A plurality of webs are provided with each web separating a tab from other tabs adjacent in a direction substantially perpendicular to the longitudinal axis of the tab.

In accordance with another aspect, a baffle for a heat exchanger has at least one heat transfer conduit with a heating fluid passing therethrough. A baffle plate is positioned in the at least one heat transfer conduit and defines a plane. The baffle plate has a first surface, an opposed second surface, and a longitudinal axis dividing the baffle plate into a first portion and a second portion. Each tab of a plurality of rows of tabs is formed of a portion of the baffle plate bent outwardly from one of the first and second surfaces. Each tab has a longitudinal axis, and defines a crease along an intersection of the tab and the baffle plate. At least one tab in each row is positioned in the first portion of the baffle plate, and at least one tab in each row is positioned in the second portion of the baffle plate. Each row has the crease of all of its tabs form an acute angle with one of a portion of a longitudinal edge of the baffle plate which is upstream, with respect to the flow of heating fluid, of the main body of its respective tab and a portion of the longitudinal edge which is downstream, with respect to the flow of heating fluid of the main body of its respective tab. The rows adjacent to the each row have the crease of all of their tabs form an acute angle with the other of a portion of a longitudinal edge of the baffle plate which is upstream, with respect to the flow of heating fluid, of the main body of its respective tab and a portion of the longitudinal edge which is downstream, with respect to the flow of heating fluid, of the main body of its respective tab. Each web of a plurality of webs separates a tab from another tab adjacent the tab in a direction substantially perpendicular to the longitudinal axis of the tab. The crease of at least one tab is directly downstream, with respect to the flow of heating fluid, of the web between two other tabs which are adjacent and upstream of the at least one tab. The number of tabs per unit length increases along the baffle plate in a downstream direction with respect to the flow of heating fluid.

From the foregoing disclosure, it will be readily apparent to those skilled in the art, that is, those who are knowledgeable or experienced in this area of technology, that the present invention provides a significant technological advance. Preferred embodiments of the baffle for a deep fryer heat exchanger can provide increased turbulence and enhanced heat transfer within the flow passages of the heat exchanger. These and additional features and advantages of the invention disclosed here will be further understood from the following detailed disclosure of certain preferred embodiments.

BRIEF DESCRIPTION OF THE DRAWINGS

Certain preferred embodiments are described in detail below with reference to the appended drawings wherein.

Figure 1:
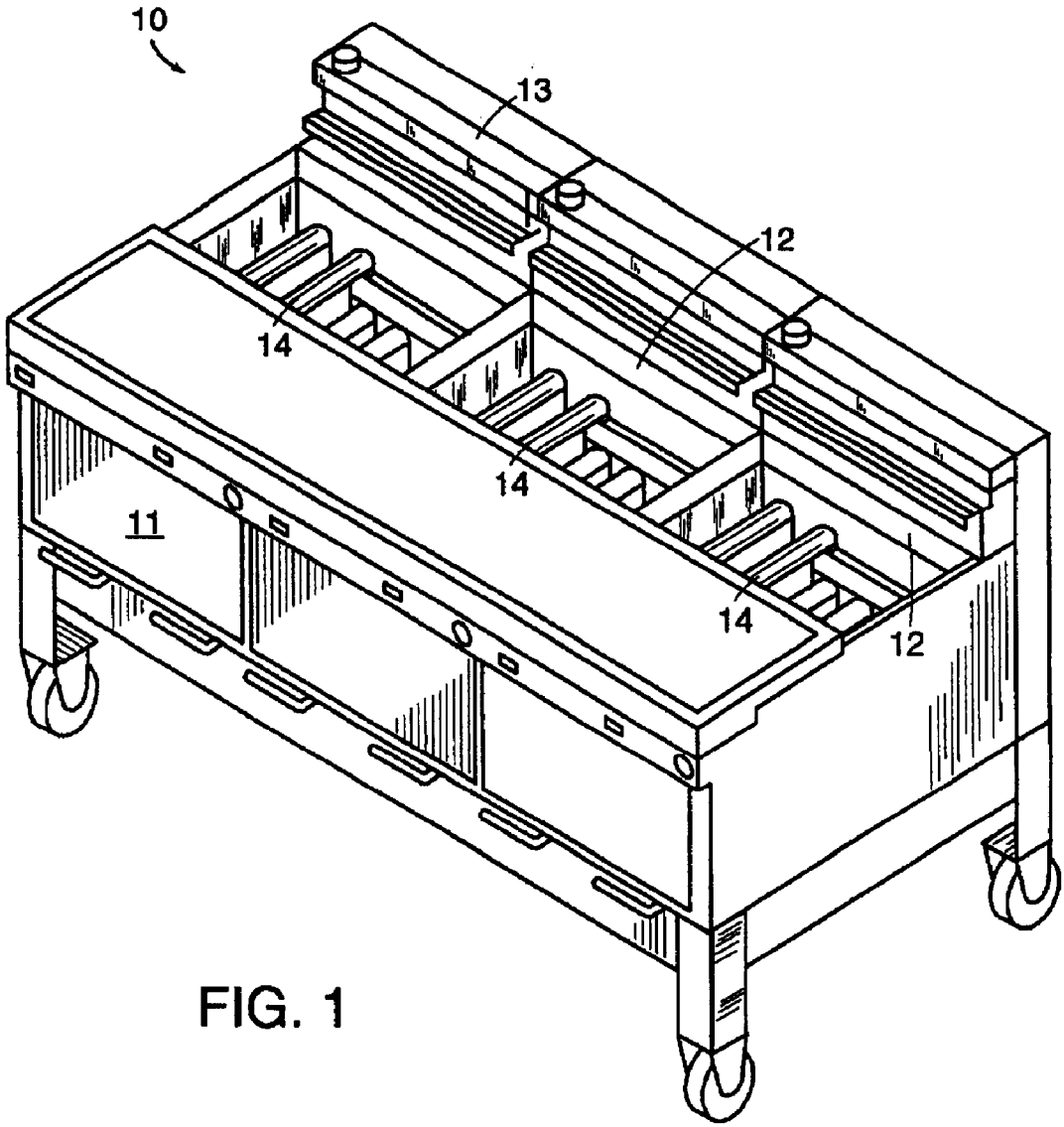
FIG. 1 is a schematic perspective view of a gas fryer containing a heat exchanger according to the present invention.

The figures referred to above are not drawn necessarily to scale and should be understood to present a representation of the invention, illustrative of the principles involved. Some features of the baffle depicted in the drawings have been enlarged or distorted relative to others to facilitate explanation and understanding. The same reference numbers are used in the drawings for similar or identical components and features shown in various alternative embodiments. Baffles, as disclosed herein, will have configurations and components determined, in part, by the intended application and environment in which they are used.

DETAILED DESCRIPTION OF CERTAIN PREFERRED EMBODIMENTS

Figure 2:
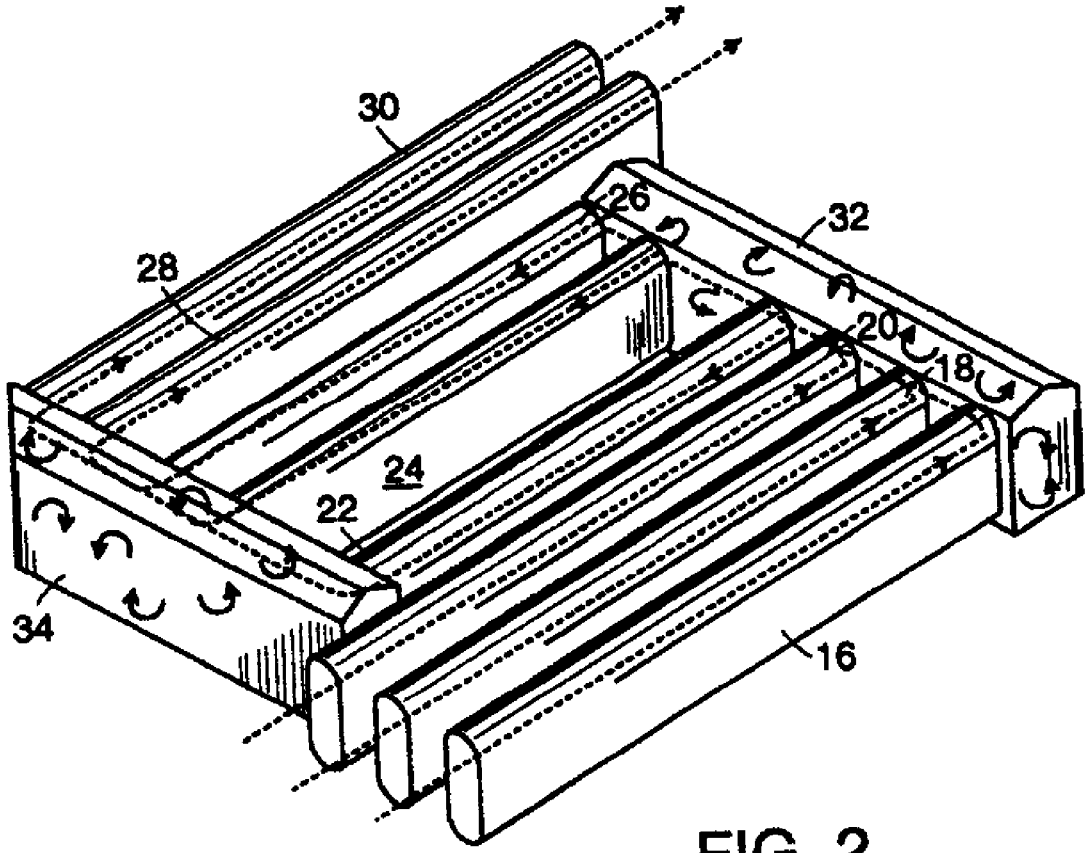
FIG. 2 is a schematic perspective view of the heat exchanger shown in FIG. 1.

Referring to FIG. 1, a gas fryer according to the present invention is shown generally by reference numeral 10. The gas fryer preferably includes a plurality of vats 12 for holding the shortening, oil, or other cooking medium, a heat exchanger 14 for heating the shortening in each vat 12, a burner section 11 for heating the fluid flowing through heat exchanger 14, and may include a blower motor in blower housing 13 for drawing the heated fluid through heat exchanger 14. Due to its efficiency and economic availability, the heat exchange fluid generally used in the present invention and in prior art gas fryers is air; however, other gaseous fluids or liquids may of course also be considered as the development thereof permits. In the preferred embodiment of FIG. 2, heat exchanger 14 includes a plurality of heat transfer conduits or tubes 16, 18, 20, 22, 24, 26, 28, 30 and two mixing plenums 32, 34. The direction of travel of the heated fluid through heat exchanger 14 is schematically illustrated in FIG. 2 to show the heated fluid entering the vat through inlet heat transfer tubes 16, 18, 20, mixing in plenum 32, passing through heat transfer tubes 22, 24, 26, mixing in plenum 34, and then exiting the vat through outlet heat transfer tubes 28, 30. In a preferred embodiment of the present invention, gas fryer 10 includes a vat 12 having internal dimensions of 20"×20", 18"×18", or 14"×14", although any other desired dimensions could also be used. Heat exchanger 14 is therefore correspondingly sized to be disposed within vat 12. A further description of the heat exchanger is provided in U.S. Pat. Nos. 5,417,202 and 5,706,717, assigned on their faces to America's Favorite Chicken Company (AFC), the entire contents of which are hereby incorporated by reference.

Figure 3:
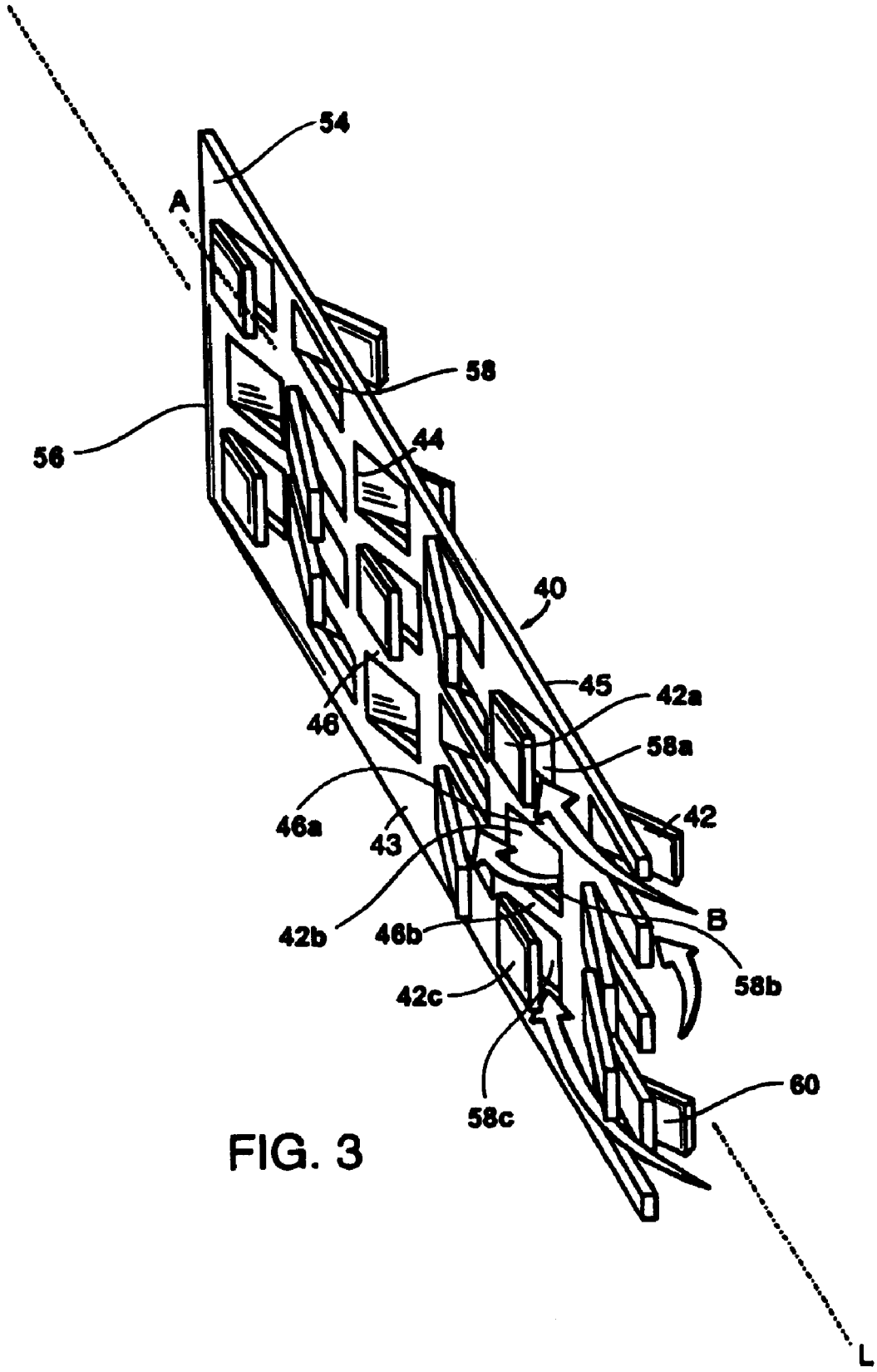
FIG. 3 is a schematic perspective view of a baffle according to the present invention.

A baffle plate 40 having a longitudinal axis L is shown in FIG. 3. Plate 40 has a plurality of tabs 42 extending outwardly from each of first surface 43 and second surface 45 of plate 40. Tabs 42 preferably extend outwardly at an acute angle with respect to the surface from which they extend. More preferably, tabs 42 extend outwardly at an angle of 45° with respect to the surface from which they extend. Each tab 42 has a longitudinal axis A which is perpendicular to crease 44. In a preferred embodiment, each tab 42 is formed by cutting plate 40 and bending a portion of plate 40 outwardly, forming crease 44 at the joint where tab 42 is bent away from plate 40. Although tabs 42 may be formed by securing separate pieces of material to plate 40, such as by welding, in which case crease 44 would extend along the line of intersection of tab 42 and plate 40, forming tabs 42 by bending a portion of plate 40 outwardly removes the welds as a potential point of failure of plate 40. Web 46 is the portion of plate 40 which remains between tabs 42 adjacent to one another in a direction substantially perpendicular to longitudinal axis A. In the embodiment illustrated in FIG. 3, where the planes of first surface 43 and second surface 45 lie in a vertical plane, web 46 is between two vertically adjacent tabs 42. It is to be appreciated that plate 40 may be oriented in a different manner and that web 46 would lie between adjacent tabs in a direction other than vertical. It is also to be appreciated that tabs 42 may have a shape other than the substantially rectangular shape shown in FIG. [2] *3*, e.g., circular, oval, or any other suitable shape which will become obvious to those skilled in the art given the benefit of this disclosure.

Figure 4:
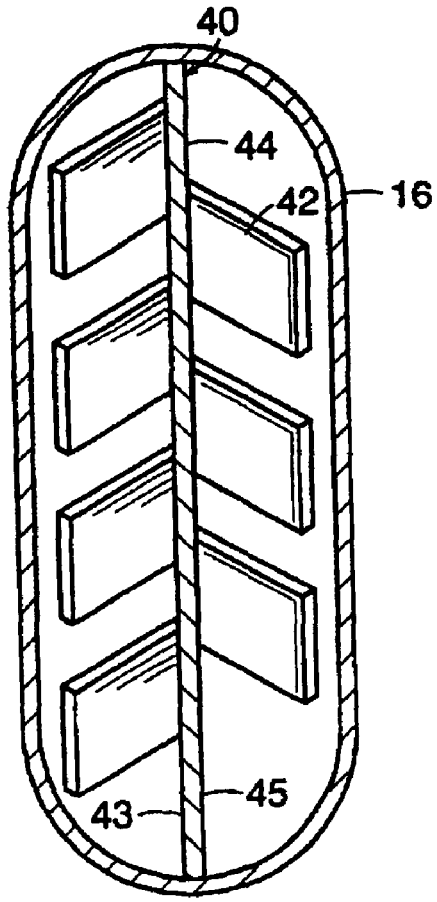
FIG. 4 is a schematic section view, showing the baffle of FIG. 3 placed within a heat transfer tube of FIG. 2.

As seen in FIG. 4, plate 40 is positioned in heat transfer tube 16. Although the discussion that follows deals primarily with heat transfer tube 16, it is to be appreciated that a plate 40 may also be placed in some, or all, of the remaining heat transfer tubes 18, 20, 22, 24, 26, 28, 30. Plate 40 is oriented within heat transfer tube 16 such that its longitudinal axis L (not shown here as it extends into the paper) extends substantially parallel to a longitudinal axis of heat transfer tube 16 and the direction of flow of heated air through heat transfer tube 16. As the heated air flows through heat transfer tube 16 it is deflected by tabs 42, increasing the turbulence of the flow within heat transfer tube 16, illustrated by the arrows B shown in FIG. 3. The increased turbulence in heat transfer tube 16 thereby enhances the heat transfer from the heated air, through heat transfer tube 16, to the shortening in the vat. Plate 40 is preferably resting within heat transfer tube 16 as opposed to being secured thereto, such as by welding, in order to reduce the stresses on heat transfer tube 16. In the embodiment illustrated in FIG. 4, heat transfer tube 16 has an oblong, or obround cross section. It is to be noted that heat transfer tube 16 may have a circular cross section, or any other suitably shaped cross section.

As illustrated in the embodiment shown in FIG. 3, plate 40 is oriented such that the leading edge of each tab 42, that is, the edge that is upstream with respect to the flow of heated air through heat transfer tube 16 (flowing into the paper as seen in FIG. 3), is the outermost edge of tab 42 with respect to plate 40. Correspondingly, in this embodiment, the trailing edge of each tab 42, that is, the edge that is downstream with respect to the flow of heated air through heat transfer tube 16, is crease 44 where tab 42 joins plate 40. Conversely, plate 40 may be oriented so that its leading and trailing edges are reversed, that is, the leading edge will be crease 44 and the trailing edge will be the outermost edge of tab 42 with respect to plate 40. In either orientation, the outwardly extending tabs 42 serve to deflect the heated air flowing through heat transfer tube 16 increasing turbulence and enhancing heat transfer. Thus, crease 44 of each tab 42 is one of upstream or downstream, with respect to the flow of heating fluid, of the main body of its tab 42. In certain preferred embodiments plate 40 may have one or more tabs 42 oriented such that their leading edge is crease 44 and one or more tabs oriented such that their trailing edge is crease 44.

Figure 5:
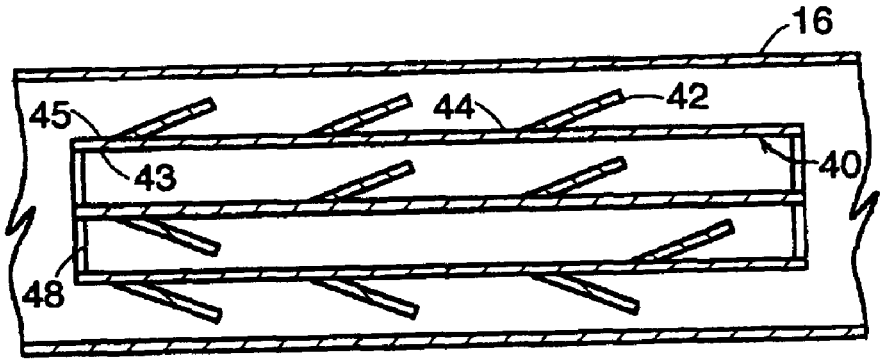
FIG. 5 is a schematic plan view, shown in section, of a plurality of baffles placed within a heat transfer tube of FIG. 2.

In certain preferred embodiments, a firebox (not shown) housing the flame produced by the burning gas is provided in burner section 11. In other preferred embodiments, there is no firebox and the flame extends directly into a single heat transfer tube 16, preferably having a circular cross section. In embodiments without a firebox, tabs 42 of plates 40 enable more complete combustion by causing better mixing of the gas and air within the single heat transfer tube 16. Additionally, where three or more plates 40 are positioned within heat transfer tube 16, the centermost plates, which reach higher temperatures since they are further from the lower temperature shortening contained in the vat, can improve combustion by reheating cool air which is introduced to the mixture. Tabs 42 and plates 40 can also increase heat transfer through radiation. Such an embodiment is shown in FIG. 5, where a plurality of plates 40 are placed in heat transfer tube 16. Plates are preferably secured to one another by cross members 48. The number and placement and size of tabs 42 associated with each plate 40 can vary, depending on the flow characteristics that are desired for that particular heat transfer tube. For example, in the case where heated air is flowing from left to right in the embodiment illustrated in FIG. 5, tabs 42 are oriented in such a manner to direct the heated air primarily from the center towards the walls of heat transfer tube 16 to improve heat transfer at the walls. Other configurations of tabs 42 to produce other desired flow characteristics will become readily apparent to those skilled in the art, given the benefit of this disclosure.

FIGS. 6–9 illustrate various embodiments of plate 40 which are shown prior to bending tabs 42 outwardly. Therefore, crease 44 is shown in dashed lines in FIGS. 6–9. In one preferred embodiment, shown in FIG. 6, plate 40 has a plurality of rows of tabs 42, with each row having a tab 42 positioned above and a tab 42 positioned below longitudinal axis L. In this preferred embodiment, longitudinal axis A of each tab 42 is substantially parallel to longitudinal axis L of plate 40.

Figure 7:
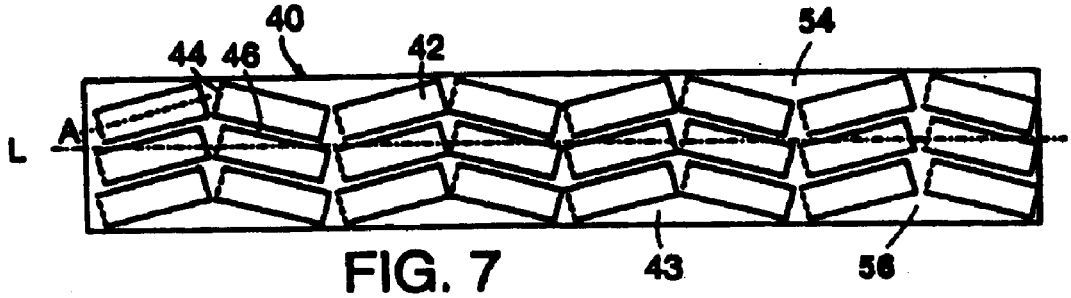

In another alternative embodiment shown in FIG. 7, tabs 42 are oriented such that their longitudinal axis A is angled with respect to longitudinal axis L of plate 40. Some of tabs 42 have their longitudinal axis A angled upwardly from their leading edge to their trailing edge with respect to longitudinal axis L, while others have their longitudinal axis A angled downwardly from their leading edge to their trailing edge with respect to longitudinal axis L. By angling the tabs upwardly and downwardly as well as outwardly, the flow of heated air is deflected up and down as well as left and right (for a plate which is oriented in a vertical or horizontal direction) within the heat transfer tubes, thereby providing additional mixing of the heated air. In the embodiment illustrated in FIG. 7, the rows alternate between having each tab in the row angled upwardly and having each tab in the row angled downwardly. In certain preferred embodiments, tabs 42 are angled upwardly or downwardly approximately 20° from longitudinal axis L. Thus, crease 44 of each tab 42 forms an acute angle with either an upstream or a downstream, with respect to the flow of heating fluid, portion of a longitudinal edge, e.g., the upper edge, of baffle plate 40. Other suitable orientations of the angle of tabs 42 will become readily apparent to those skilled in the art, given the benefit of this disclosure.

Figure 8:
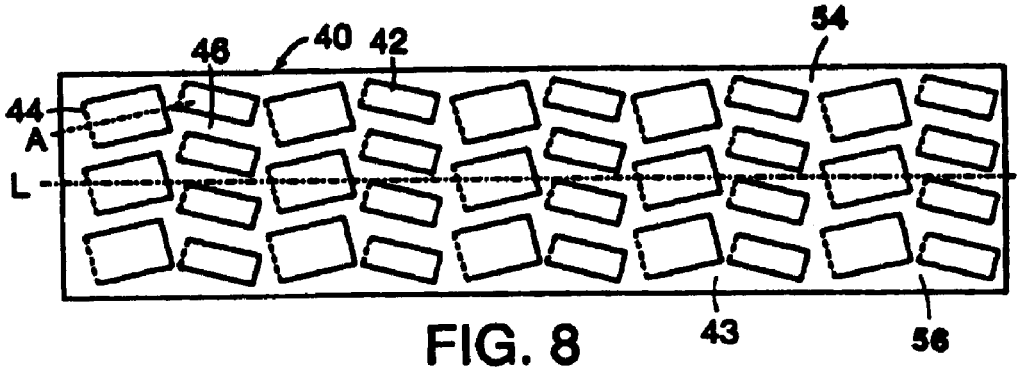

Another alternative embodiment is shown in FIG. 8, where tabs 42 of each row are vertically offset from tabs 42 in adjacent rows such that there are tabs 42 in all but the first row which are directly downstream of a web 46 in the upstream adjacent row. This prevents any long channels of uninterrupted flow from being established along the length of heat transfer tube 16. In the illustrated embodiment, the rows alternate between having three tabs 42 and four tabs 42. It is to be appreciated that the rows may have the same, or different, number of tabs 42 from each of the other rows.

Figure 9:
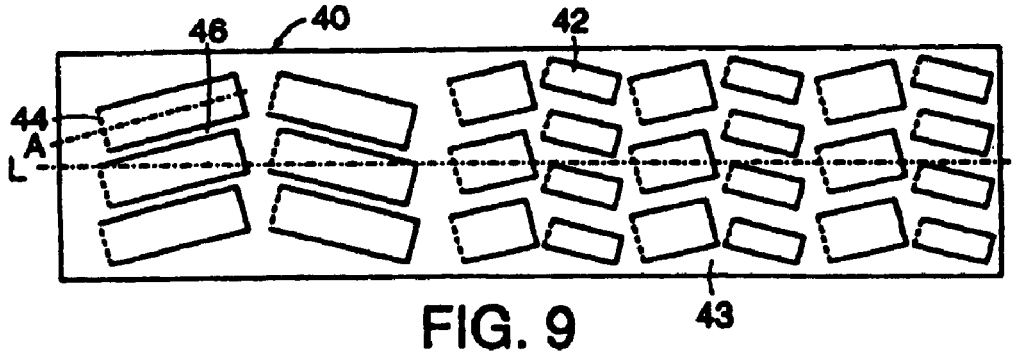

Yet another alternative embodiment is shown in FIG. 9, which is similar to the embodiment shown in FIG. 8, however, plate 40 in the embodiment shown in FIG. 9 has a higher number of tabs 42 at its downstream end than at its upstream end. That is, the number of tabs 42 per unit length of plate 40 increases along plate 40 in a downstream direction to provide increased heat transfer.

Figure 10:
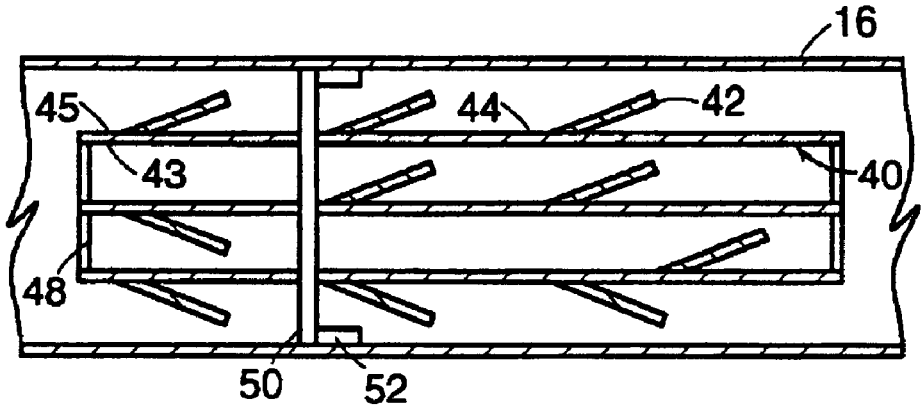
FIG. 10 is a schematic plan view, shown in section, of an alternative embodiment of the baffle of FIG. 5.
Figure 11:
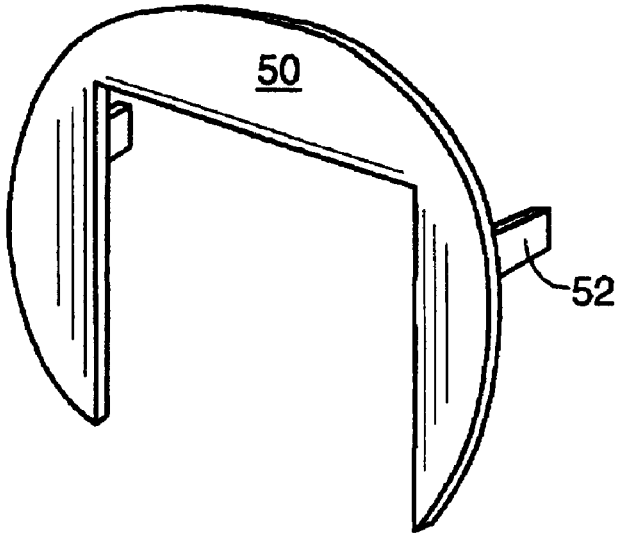
FIG. 11 is a schematic perspective view of the perimeter plate of FIG. 10.

Another alternative embodiment is shown in FIGS. 10, 11. Perimeter plate 50 is positioned between plates 40 and an inside surface of heat transfer tube 16. That is, perimeter plate 50 surrounds, at least partially, plates 40 and the plane of plate 50 is substantially perpendicular to the plane of plates 40. Thus, perimeter plate 50 reduces the tendency for the heated air to travel along the wall of heat transfer tube 16, unobstructed by any tabs 42. In the embodiment illustrated in FIG. 11, perimeter plate 50 has an inverted U-shape. Plate 50 can be slid over plates 40 such that plate 50 is positioned between the inside surface of heat transfer tube 16 and the tops and sides of plates 40. It is to be appreciated that plate 50 may be formed so as to fit between the inside surface of heat transfer tube 16 and any or all of the tops, bottoms, and sides of plates 40. In the embodiment illustrated, where heat transfer tube 16 is circular, plate 50 has a circular outer perimeter to mate with the surface of heat transfer tube 16 and plate 50 generally comprises three segments of a circle. Naturally, plate 50 may have a different shaped perimeter to match that of the heat transfer tube within which it is positioned. Tabs 52 extend from plate 50 in a direction substantially perpendicular to the plane of plate 50 and abut the inside surface of heat transfer tube 16. Tabs 52 help reduce any tendency of plate 50 from twisting within heat transfer tube 16.

*As shown in FIG. 3, in one embodiment, crease 44 of each tab 42 is downstream with respect to the flow of the heating fluid designated as "B" in FIG. 3. As shown in FIG. 3, heating fluid B is deflected by tabs 42.*

*As shown in FIG. 3 and as discussed herein, tabs 42 comprise portions of plate 40 which are bent outwardly away from either first surface 41 or second surface 43 of plate 40. As shown in FIGS. 3 and 6–9, at least one of tabs 42 is positioned in the first portion 54 of plate 40 on one side of the longitudinal axis of plate 40 designated as "L" in FIGS. 3 and 6–9 and at least one other of tabs 42 is positioned in second portion 56 of plate 40 which is on the other side of plate 40's longitudinal axis L.*

*As shown in FIGS. 3, 4, and 6–9, at least some of tabs 42 are positioned in a plurality of rows of tabs. As shown in these Figures, in some embodiments, the rows extend in a direction substantially perpendicular to the longitudinal axis of plate 40. As shown in FIGS. 3, 4, and 6–9, each row of tabs has a tab 42 positioned in first portion 54 of plate 40 and a tab 42 positioned in second portion 56 of plate 40. As shown in FIG. 3, in one embodiment, a row of tabs has a tab 42a extending outwardly away from first surface 43 of plate 40, an adjacent tab 42b extending outwardly away from second surface 45 of plate 40 and a third tab 42c which is adjacent tab 42b and which extends outwardly away from first surface 43 of plate 40. As shown in FIG. 3, other rows of tabs may have the individual tabs extending from either the first surface 43 or second surface 45.*

*As shown in FIGS. 3 and 6–9, in some embodiments, for the purpose of describing location and distribution of invention elements, a center line of plate 40 may be located where the longitudinal axis is shown located along the center of plate 40. As shown in the figures, in some embodiments tabs 42, holes 58 and tab/hole pairs are arranged so the same are found on both sides of the center line. Further, as shown in the figures and described herein, in some embodiments these elements are also arranged symmetrically in a pattern about the center line. In such embodiments, as shown in the figures, the portion of the plate 40 referred to as first portion 54 is instead referred to as first half 54 and the portion of plate 40 referred to as second portion 56 is instead referred to as second half 56.*

*As shown in FIG. 3, each tab 42 is adjacent to its corresponding hole 58 in plate 40 created by bending tab 42 from plate 40. At least a portion of a side of each hole 58 is comprised of crease 44 of tab 42 that hole 58 is adjacent to. As shown in FIG. 3, crease 44 both connects tab 42 to plate 40 and is at least a portion of a side of hole 58. As shown*

*in FIG. 3 and reflected in FIGS. 4–10, tabs 42 extend outwardly from plate 40 over at least part of their adjacent corresponding holes 58. As expressly shown in FIG. 3, and as is implicit in FIGS. 4–10 and the above discussion, heating fluid B is flowable through holes 58 created in plate 40 by bending tabs 42 out of plate 40. Further, in some embodiments, as shown in FIG. 3 and implicit in FIGS. 4–10, heating fluid B is diverted by inner surface 60 of tab 42 through tab 42's corresponding hole 58.*

*As shown in FIGS. 3, 4, 5, and 10, the tabs 42 are not in contact with heat transfer tube 16. The baffle plate 40 is located and angled within transfer tube 16, and each of the plurality of tabs 42 on baffle plate 40 have a length and angle which positions tabs 42 relative to heat transfer tube 16 so the tabs 42 are not in contact with heat transfer tube 16. As discussed above, the increased turbulence of flow within heat transfer tube 16 caused by the invented baffle plate improves and enhances heat transfer from the hot gases through heat transfer tube 16 into the vat containing shortening of the deep fat fryer system.*

*Each tab 42 and its corresponding hole 58, share a common crease 44 and are referred to herein as comprising a "tab/hole pair." As shown in FIG. 3, tab 42a and hole 58a comprise tab 42a/hole 58a pair. Tab 42b and hole 58b comprise tab 42b/hole 58b pair. Tab 42c and hole 58c comprise tab 42c/hole 58c pair.*

*As shown in FIG. 3, Web 46a is the portion of plate 40 between tab 42a/hole 58a pair and tab 42b/hole 58b pair. Web 46b is the portion of plate 40 between tab 42b/hole 58b pair and tab 42c/hole 58c pair.*

*As shown in FIGS. 3 and 6–9, each row of tabs 42, holes 58 and tab/hole pairs may be comprised of at least two tabs, two holes or two tab/hole pairs, or at least three tabs, three holes and three tab/hole pairs, or at least four tabs, four holes and four tab/hole pairs.*

*As shown in FIGS. 3 and 6–9, each row has n−1 webs, where n equals the number of tab/hole pairs in the row. If a row is comprised of three tabs and three holes, i.e. three tab/hole pairs, that row has two webs (3 tab/hole pairs−1=2 webs). If a row is comprised of four tabs and four holes, i.e. four tab/hole pairs, that row has three webs (4 tab/hole pairs−1=3 webs).*

*As shown in FIGS. 3–5 and 7–10, the relationship of tabs 42 on the baffle plate 40 is to generally present alternating sizes, arrangements and angles to the flowing heated gas and alternating from extending from first surface 43 and then second surface 45. Some rows are presented in which tabs 42 alternately extend from the first side and second side. As shown in the figures, tabs 42 are presented which extend from the first surface of the tab preceding it (from the point of view of the flowing heated gas of FIG. 3) extend from the second surface and vise versa.*

Figure 6:
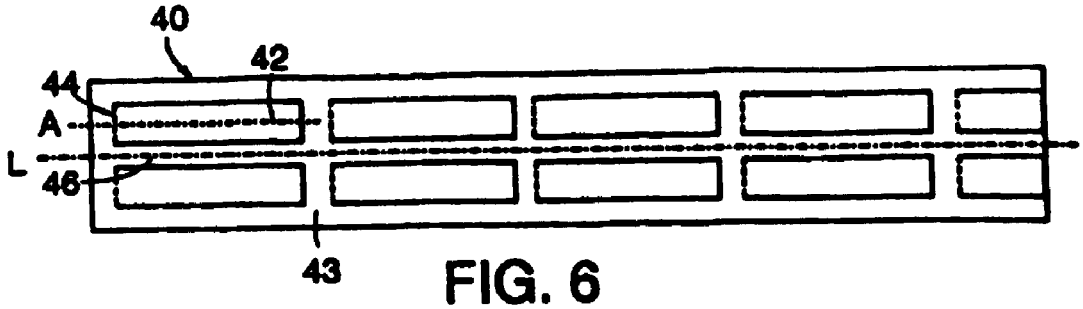
FIGS. 6–9 are schematic elevation views illustrating various embodiments of the baffle of FIG. 3.

*As shown in the Figs., an equal or approximately equal number of tabs, holes, webs, and tab hole pairs may be arranged on either side of the center line of baffle plate 40 on both sides of the baffle plate, which is shown in FIGS. 3 and 6–9 as corresponding with longitudinal axis L. As shown in FIGS. 3 and 6–9, they may be and arranged generally symmetrically about the longitudinal axis L. As shown in FIG. 6, the webs and tabs may be positioned in straight lines, one behind another, in the direction of the longitudinal axis L. As shown in FIG. 6, the tabs 42 may be similarly positioned.*

In light of the foregoing disclosure of the invention and description of the preferred embodiments, those skilled in this area of technology will readily understand that various modifications and adaptations can be made without departing from the true scope and spirit of the invention. All such modifications and adaptations are intended to be covered by the following claims:

I claim:

1. A heat exchanger for a *deep* fryer system, *the heat exchanger being within a vat containing shortening, the heat exchanger* comprising, in combination:

at least one heat transfer conduit having a heating fluid passing therethrough;

a baffle plate disposed within the at least one heat transfer conduit, defining a plane and having a first surface, an opposed second surface, and a longitudinal axis which divides the baffle plate into a first portion and a second portion;

a plurality of tabs, each tab *comprised of a portion of the baffle plate which is cut from the baffle plate and bent away from one of the first and second surfaces, the tab leaving a hole in the baffle plate and* having a longitudinal axis and extending outwardly away from one of the first and second surfaces of the baffle plate, an intersection of the tab and the baffle plate defining a crease, [at least one] *a plurality* of the tabs being positioned in the first portion of the baffle plate and [at least one] *a plurality* of the tabs being positioned in the second portion of the baffle plate, *a plurality of the tabs extending outwardly from the first surface and a plurality of the tabs extending outwardly from the second surface*; and a plurality of webs, each web separating a tab from another tab adjacent the tab in a direction substantially perpendicular to the longitudinal axis of the tab.

[2. A heat exchanger according to claim 1, wherein each tab extends outwardly at an acute angle with respect to the surface from which it extends.]

[3. A heat exchanger according to claim 1, wherein each tab extends outwardly at an angle of approximately 45° with respect to the surface from which it extends.]

[4. A heat exchanger according to claim 1, wherein the tabs are positioned in a plurality of rows, each row extending in a direction substantially perpendicular to the longitudinally axis of the baffle plate.]

[5. A heat exchanger according to claim 1, wherein the crease of at least one tab forms an acute angle with the longitudinal axis of the baffle plate.]

6. A heat exchanger according to claim 1, wherein the crease of [each tab] *the plurality of tabs* forms an acute angle with the longitudinal axis of the baffle plate.

7. A heat exchanger according to claim 1, wherein the crease of at least one tab forms an acute angle with a portion of a longitudinal edge of the baffle plate which is downstream of the crease of the at least one tab, and the crease of at least one other tab forms an acute angle with a portion of the longitudinal edge of the baffle plate which is upstream of the crease of the at least one other tab.

8. A heat exchanger according to claim [4] *1*, wherein the *tabs are arranged in a plurality of rows, each row extending in a direction substantially perpendicular to the longitudinal axis of the baffle plate, each row having at least three tabs and the* rows alternate between having the crease of each tab in a row form an acute angle with a portion of a longitudinal edge of the baffle plate which is downstream, with respect to the flow of heating fluid, of the row and having the crease of each tab in a row form an acute angle with a portion of the longitudinal edge of the baffle plate which is upstream, with respect to the flow of heating fluid, of the row.

9. A heat exchanger according to claim [4] *1*, wherein at least one row having the crease of each tab in that row form an acute angle with a portion of a longitudinal edge of the baffle plate which is downstream, with respect to the flow of heating fluid, of that row is separated from at least one other row having the crease of each tab in that other row form an acute angle with a portion of the longitudinal edge of the baffle plate which is upstream, with respect to the flow of heating fluid, of that row by a separate row having the crease of each tab in that separate row form a right angle with the longitudinal edge of the baffle plate.

10. A heat exchanger according to claim 1, wherein the crease of at least one tab is positioned directly downstream, with respect to the flow of heating fluid, of the web between two tabs which are adjacent and upstream of the at least one tab.

11. A heat exchanger according to claim 1, wherein the crease of each tab is upstream, with respect to the flow of heating fluid, of a main body of [the] each tab.

12. A heat exchanger according to claim 1, wherein the crease of each tab is downstream, with respect to the flow of heating fluid, of a main body of [the] each tab.

13. A heat exchanger according to claim 1, wherein the crease of at least one tab is downstream, with respect to the flow of heating fluid, of a main body of the at least one tab and the crease of at least one other tab is upstream, with respect to the flow of heating fluid, of the main body of the at least one other tab.

14. A heat exchanger according to claim 1, wherein each of the tabs comprises a portion of the baffle plate which is bent outwardly away from one of the first and second surfaces.

15. A heat exchanger according to claim 1, further comprising at least one additional baffle plate disposed in the at least one heat transfer conduit.

16. A heat exchanger according to claim 15, wherein the at least one additional baffle plate has a different configuration of tabs than at least one other baffle plate.

17. A heat exchanger according to claim 15, wherein the at least one additional baffle plate has a different number of tabs than at least one other baffle plate.

18. A heat exchanger according to claim 15, further comprising a perimeter plate defining a plane and positioned between an inside surface of the at least one heat transfer conduit and the baffle plates.

19. A heat exchanger according to claim 18, wherein the plane of the perimeter plate is substantially perpendicular to the planes of the baffle plates.

20. A heat exchanger according to claim 1, wherein a portion of the baffle plate has a greater number of tabs than an equally sized portion of the baffle plate which is upstream, with respect to the flow of heating fluid, of the portion of the baffle plate.

21. A heat exchanger according to claim 1, wherein the number of tabs per unit length increases along the baffle plate in a downstream direction with respect to the flow of heating fluid.

22. A heat exchanger according to claim 1, further comprising a perimeter plate defining a plane and positioned between an inside surface of the at least one heat transfer conduit and the baffle plate.

23. A heat exchanger according to claim 22, wherein the plane of the perimeter plate is substantially perpendicular to the plane of the baffle plate.

24. A heat exchanger according to claim 1, wherein the longitudinal axis of the baffle plate extends substantially parallel to a longitudinal axis of the at least one heat transfer conduit.

25. A baffle for a heat exchanger in a deep fryer, the heat exchanger having at least one heat transfer conduit with [a] heating fluid passing therethrough, comprising, in combination:

a baffle plate positioned within the at least one heat transfer conduit defining a plane and having a first surface, an opposed second surface, and a longitudinal axis which divides the baffle plate into a first portion and a second portion;

a plurality of rows of tabs, each tab comprising a portion of the baffle plate bent outwardly from one of the first and second surfaces, having a longitudinal axis, and defining a crease along an intersection of the tab and the baffle plate, at least one tab in each row being positioned in the first portion of the baffle plate, at least one tab in each row being positioned in the second portion of the baffle plate, each row having the crease of all of its tabs form an acute angle with one of a portion of a longitudinal edge of the baffle plate which is upstream, with respect to the flow of heating fluid, of a main body of its respective tab and a portion of the longitudinal edge which is downstream, with respect to the flow of heating fluid, of the main body of its respective tab and the rows adjacent to the each row having the crease of all of their tabs form an acute angle with the other of a portion of the longitudinal edge which is upstream, with respect to the flow of heating fluid, of the main body of its respective tab and a portion of the longitudinal edge which is downstream, with respect to the flow of heating fluid, of the main body of its respective tab; and a plurality of webs, each web separating a tab from another tab adjacent the tab in a direction substantially perpendicular to the longitudinal axis of the tab, the crease of at least one tab being directly downstream, with respect to the flow of heating fluid, of the web between two other tabs which are adjacent and upstream, with respect to the flow of heating fluid, of the at least one tab;

wherein the number of tabs per unit length increases along the baffle plate in a downstream direction with respect to the flow of heating fluid.

*26. A heat exchanger for a deep fryer system having a gas burner to heat fluid flowing through the heat exchanger, the heat exchanger being within a vat containing shortening, the heat exchanger comprising, in combination:*

*at least one heat transfer conduit having heating fluid passing therethrough;*

*a baffle plate disposed within the at least one heat transfer conduit defining a plane and having a first surface, an opposed second surface, and a longitudinal axis which divides the baffle plate into a first portion and a second portion;*

*a plurality of tabs, each tab having a longitudinal axis and extending outwardly away from one of the first and second surfaces of the baffle plate, an intersection of the tab and the baffle plate defining a crease, the crease being created by bending the tab from the baffle plate, at least one of the tabs being positioned in the first portion of the baffle plate and at least one of the tabs being positioned in the second portion of the baffle plate;*

*the baffle plate being positioned within the heat transfer conduit and the tabs having a length and an angle which position the tabs relative to the heat transfer conduit so the tabs do not contact the heat transfer conduit and do not prevent the heating fluid from flowing between the tabs and those portions of the heat transfer conduit most closely adjacent to each of the tabs;*

*the tabs being comprised of a portion of the baffle plate which is cut from the baffle plate and bent away from one of the first and second surfaces, each of the tabs leaving a hole in the baffle plate;*

*at least a portion of a side of each hole comprised of the crease of the tab which was cut and bent from the baffle plate to leave the hole, the tab and the hole which share a crease defining a tab/hole pair;*

*a plurality of webs, each web separating a first tab/hole pair from a second tab/hole pair which is adjacent to the first tab/hole pair in a direction substantially perpendicular to the longitudinal axis of the tab;*

*a plurality of the tabs being bent outwardly away from the first surface and a plurality of the tabs being bent outwardly away from the second surface;*

*a plurality of rows of tab/hole pairs, each row extending in a direction substantially perpendicular to the longitudinal axis of the baffle plate and having at least three tab/hole pairs, each of the tab/hole pairs in each row being separated from each adjacent tab/hole pair in the row by a web;*

*there being at least two webs in each row of tab/hole pairs, the webs in each row of the tab/hole pairs comprising a row of webs extending in a direction substantially perpendicular to the longitudinal axis of the baffle plate;*

*a plurality of rows of webs;*

*a plurality of rows of tab/hole pairs, which rows each have at least one tab/hole pair positioned in the first portion of the baffle plate and at least one tab/hole pair positioned in the second position of the baffle plate;*

*a plurality of rows of tab/hole pairs, each row of table/hole pairs having at least one tab extending outwardly away from the first surface of the baffle plate and at least one tab extending outwardly away from the second surface of the baffle plates;*

*the baffle plate being positioned within the heat transfer conduit and shaped so that the tabs are capable of deflecting the heating fluid so that the heating fluid is capable of flowing (1) through the holes, (2) between the tabs, (3) adjacent to the webs and (4) between the tabs and the heat transfer conduit so the baffle plate, tabs, and holes are capable of collectively causing increased turbulence of the heating fluid passing through the heat transfer conduit, the increased turbulence improving heat transfer from the heating fluid within the heat transfer conduit to the shortening within the vat of the deep fryer system as compared to a similar heat exchanger for a deep fryer system which does not utilize a baffle plate.*

*27. A heat exchanger according to claim 26 wherein a plurality of tabs are positioned directly upstream, with respect to the flow of heating fluid, of the web between two tabs which are adjacent to each other and downstream of the plurality of tabs; and*

*a plurality of tabs are positioned directly downstream, with respect to the flow of heating fluid, of the web between two tabs which are adjacent and downstream of the plurality of tabs.*

*28. A heat exchanger according to claim 26 wherein a plurality of the webs are positioned in a straight line, one behind another, in the direction of the longitudinal axis of the baffle plate.*

*29. A heat exchanger for a deep fryer system having a gas burner to heat fluid flowing through the heat exchanger, the heat exchanger being contained within a vat containing shortening, the heat exchanger comprising, in combination:*

*at least one heat transfer conduit having heating fluid passing therethrough;*

*a baffle plate disposed within the at least one heat transfer conduit defining a plane and having a first surface, an opposed second surface, and a longitudinal axis which divides the baffle plate into a first portion and a second portion;*

*a plurality of tabs, each tab having a longitudinal axis and extending outwardly away from one of the first and second surfaces of the baffle plate, an intersection of the tab and the baffle plate defining a crease, the crease being created by bending the tab from the baffle plate, at least one of the tabs being positioned in the first portion of the baffle plate and at least one of the tabs being positioned in the second portion of the baffle plate;*

*the baffle plate being positioned within the heat transfer conduit and the tabs having a length and an angle which position the tabs relative to the heat transfer conduit so the tabs do not contact the heat transfer conduit and do not prevent the heating fluid from flowing between the tabs and the portions of the heat transfer conduit most closely adjacent to each of the tabs;*

*the tabs being comprised of a portion of the baffle plate which is cut from the baffle plate and bent away from one of the first and second surfaces, each of the tabs leaving a hole in the baffle plate;*

*at least a portion of a side of each hole comprised of the crease of the tab which was cut and bent from the baffle to leave the hole, the tab and the hole which share a crease defining a tab/hole pair;*

*a plurality of webs, each web separating a first tab/hole pair from a second tab/hole pair which is adjacent to the first tab/hole pair in a direction substantially perpendicular to the longitudinal axis of the tab;*

*a plurality of the tabs being bent outwardly away from the first surface and a plurality of the tabs being bent outwardly away from the second surface;*

*at least five rows of tab/hole pairs, each row extending in a direction substantially perpendicular to the longitudinal axis of the baffle plate and having at least four tab/hole pairs and at least three webs, each of the tab/hole pairs in each row being separated from each adjacent tab/hole pair in the row by a web;*

*a plurality of rows of tab/hole pairs, which rows each have a tab/hole pair positioned in the first portion of the baffle plate and a tab/hole pair positioned in the second position of the baffle plate;*

*a plurality of rows of tab/hole pairs, which rows have a tab extending outwardly away from the first surface of the baffle plate and a tab extending outwardly away from the second surface of the baffle plates;*

*the tab/hole pairs being arranged on the baffle plate so that an equal number of tabs are on either side of the center line of the first surface of the baffle plate and the tab/hole pairs are arranged on the first surface of the baffle plate symmetrically about the center line of the baffle plate and so an equal number of tabs are on either side of the center line of the second surface of the baffle plate and the tab/hole pairs are arranged on the second surface of the baffle plate symmetrically about the center line of the baffle plate;*

*the baffle plate is positioned and shaped so that the tabs are capable of deflecting the heating fluid so that the heating fluid is capable of flowing (1) through the holes, (2) between the tabs, (3) adjacent the webs and (4) between the tabs and the heat transfer conduit so the baffle plate, tabs, holes and webs are capable of collectively causing increased turbulence of the heating fluid passing through the heat transfer conduit, the increased turbulence improving heat transfer from the heating fluid within the heat transfer conduit to the shortening within the vat of the deep fryer system as compared to a similar heat exchanger for a deep fryer system which does not utilize a baffle plate.*

*30. The heat exchanger of claim 29 wherein at least a portion of the webs are positioned directly upstream, with respect to the flow of heating fluid, of a tab located in an immediately downstream row of tabs and at least a portion of the webs are positioned directly downstream of a tab located in an immediately upstream row of tabs.*

*31. A heat exchanger according to claim 29 wherein a plurality of the webs are in a straight line, one behind another, in the direction of the longitudinal axis of the baffle plate.*

*32. A heat exchanger for a deep fryer system comprising, in combination:*

*at least one heat transfer conduit for heating fluid passing therethrough;*

*a baffle plate disposed within the at least one heat transfer conduit, defining a plane and having a first surface, an opposed second surface, and a longitudinal axis which divides the baffle plate into a first portion and a second portion;*

*a plurality of tabs, each tab having a longitudinal axis and extending outwardly away from one of the first and second surfaces of the baffle plate, an intersection of the tab and the baffle plate defining a crease, at least one of the tabs being positioned in the first portion of the baffle plate and at least one of the tabs being positioned in the second portion of the baffle plate;*

*substantially all of the tabs being separated from adjacent tabs by a web, each web separating a tab from another tab adjacent the tab in a direction substantially perpendicular to the longitudinal axis of the tab;*

*each of the tabs comprises a portion of the baffle plate which is bent outwardly away from one of the first and second surfaces;*

*each tab being positioned adjacent to a corresponding hole in the baffle plate;*

*the heating fluid being capable of flowing through the hole created in the baffle plate by bending said tab out of the baffle plate;*

*a plurality of rows of tabs, each of which rows has a tab positioned in the first portion of the baffle plate and a tab positioned in the second position of the baffle plate;*

*a plurality of rows of tabs, each of which rows has a tab extending outwardly away from the first surface of the baffle plate and a tab extending outwardly away from the second surface of the baffle plates;*

*a majority of the tab/hole pairs created by bending the tab from the baffle plate leaving a hole in the baffle plate are positioned in a plurality of rows of tab/hole pairs tabs, each row of tab/hole pairs extending in a direction substantially perpendicular to the longitudinal axis of the baffle plate;*

*each row of tab/hole pairs has a tab positioned in the first portion of the baffle plate and a tab positioned in the second position of the baffle plate;*

*each row of tab/hole pairs has a tab extending outwardly away from the first surface of the baffle plate and a tab extending outwardly away from the second surface of the baffle plate;*

*a plurality of the rows of tabs have at least three tabs, a first tab positioned above the plane of the baffle plate, a second adjacent tab separated from the first tab by a web and positioned below the plane of the baffle plate, and a third tab, separated by a web from the second tab and positioned above the plane of the baffle plate; and*

*the tabs are located, and shaped so the tabs are capable of deflecting the heating fluid and the heating fluid is flowable (1) through the holes, (2) between the tabs and (3) between the tabs and the heat transfer conduit so the baffle plate, tabs, and holes are capable of collectively causing increased turbulence of the heating fluid passing through the heat transfer conduit to improve heat transfer from the heating fluid through the heat transfer conduit to the shortening within the vat of the deep fryer system as compared to a heat exchanger for a deep fryer system which does not utilize a baffle plate.*

*33. A heat exchanger according to claim 32, wherein each tab extends outwardly at an acute angle with respect to the surface of the baffle plate from its crease and each tab being capable of deflecting the heating fluid through its corresponding hole in the baffle plate and outwardly away from the baffle plate.*

*34. A heat exchanger according to claim 32, wherein an approximately equal number of tabs are on either side of the longitudinal axis of the baffle plate and the tabs are arranged on the baffle plate generally symmetrically about the longitudinal axis of the baffle plate.*

*35. A heat exchanger according to claim 32 wherein the heat exchanger has a plurality of heat transfer conduits located within the vat containing shortening.*

*36. A heat exchanger according to claim 32, additionally comprising at least six rows of tabs on the baffle plate, including at least three tabs per row.*

*37. A baffle for a heat exchanger in a deep fryer, the heat exchanger having at least one transfer conduit for heating fluid to pass therethrough, comprising, in combination:*

*a baffle plate positioned within the at least one heat transfer conduit defining a plane and having a first surface, and an opposed second surface and a longitudinal axis which divides the baffle plate into a first portion and a second portion;*

*a plurality of rows of tabs, at least three tabs in most of the rows of tabs, each tab comprising a portion of the baffle plate that is bent outwardly from one of the first and second surfaces and leaving a hole in the baffle plate, having a longitudinal axis, and defining a crease along an intersection of the tab and the baffle plate, at least one tab in each row being positioned in the first portion of the baffle plate, at least one tab in each row being positioned in the second portion of the baffle plate;*

*at least a portion of a side of each hole comprises the crease of the tab the hole is adjacent to, the tab extending outwardly from the baffle plate over at least part of the adjacent hole, the tab and the hole which share a crease defining a tab/hole pair;*

*a plurality of adjacent tabs being separated from each other by a web;*

*a plurality of rows of webs, at least two webs in most of the rows of webs, each web separating a tab from another adjacent tab in a direction substantially per-*

*pendicular to the longitudinal axis of the baffle plate; the tabs and webs are positioned upon the baffle plate and shaped so the tabs are capable of deflecting the heating fluid and the heating fluid is flowable between the tabs and adjacent to the webs;*

*and wherein the tabs are positioned and shaped so the tabs are capable of deflecting the heating fluid and the heating fluid is flowable (1) through the holes, (2) between the tabs and (3) between the tabs and the heat transfer conduit so the baffle plate, tabs, and holes are capable of collectively causing increased turbulence of the heating fluid passing through the heat transfer conduit to improve heat transfer from the heating fluid through the heat transfer conduit to the shortening within the vat of the deep fryer system as compared to a heat exchanger for a deep fryer system which does not have a baffle plate.*

*38. The heat exchanger of claim 37, wherein the crease of a plurality of tabs in each row of tabs is directly downstream, with respect to the flow of the heating fluid, of the creases of the tabs in the rows of tabs directly upstream and directly upstream of the creases of the tabs in the row of tabs directly downstream.*

*39. A heat exchanger according to claim 37 wherein each row of tab/hole pairs has a tab extending outwardly away from the first surface of the baffle plate and a tab extending outwardly away from the second surface of the baffle plate.*

*40. A heat exchanger according to claim 37 wherein an approximately equal number of tabs are on either side of the longitudinal axis of the baffle plate and the tabs are arranged on the baffle plate generally symmetrically about the longitudinal axis of the baffle plate.*

*41. A heat exchanger according to claim 37, additionally comprising at least six rows of tabs on the baffle plate including at least three tabs per row.*

*42. A deep fryer system having a heat exchanger and a burner to heat air flowing through the heat exchanger, the heat exchanger being within the deep fryer system's vat containing shortening, the heat exchanger portion of the deep fat fryer system comprising:*

*at least one heat transfer conduit having heating fluid passing therethrough;*

*a baffle plate disposed within the at least one heat transfer conduit defining a plane and having a first surface, an opposed second surface, and a longitudinal axis which divides the baffle plate into a first portion and a second portion;*

*a plurality of tabs, each tab having a longitudinal axis and extending outwardly away from one of the first and second surfaces of the baffle plate, an intersection of the tab and the baffle plate defining a crease, the crease being created by bending the tab from the baffle plate, at least one of the tabs being positioned in the first portion of the baffle plate and at least one of the tabs being positioned in the second portion of the baffle plate;*

*the tabs being comprised of a portion of the baffle plate which is cut from the baffle plate and bent away from one of the first and second surfaces, each of the tabs leaving a hole in the baffle plate;*

*at least a portion of a side of each hole is comprised of the crease of the tab which was cut and bent from the baffle to leave the hole, the tab and the hole which share a crease defining a tab/hole pair;*

*a plurality of webs, each web separating a first tab/hole pair from a second tab/hole pair which is adjacent to the first tab/hole pair in a direction substantially perpendicular to the longitudinal axis of the tab;*

*a plurality of the tabs being bent outwardly away from the first surface and a plurality of the tabs being bent outwardly away from the second surface;*

*a plurality of rows of tab/hole pairs, each row extending in a direction substantially perpendicular to the longitudinal axis of the baffle plate and having at least three tab/hole pairs, each of the tab/hole pairs in each row being separated from each adjacent tab/hole pair in the row by a web;*

*there being at least two webs in each row of tab/hole pairs, the webs in each row of the tab/hole pairs comprising a row of webs extending in a direction substantially perpendicular to the longitudinal axis of the baffle plate;*

*a plurality of rows of webs, at least two webs in most of the rows of webs, each web separating a tab from another adjacent tab in a direction substantially perpendicular to the longitudinal axis of the baffle plate; the tabs and webs are positioned and shaped so the tabs are capable of deflecting the heating fluid and the heating fluid is flowable between the tabs and adjacent to the webs;*

*a plurality of rows of tab/hole pairs, which rows each have at least one tab/hole pair positioned in the first portion of the baffle plate and at least one tab/hole pair positioned in the second position of the baffle plate;*

*a plurality of rows of tab/hole pairs; which rows have at least one tab extending outwardly away from the first surface of the baffle plate and at least one tab extending outwardly away from the second surface of the baffle plate;*

*a plurality of webs arranged in a straight line, one behind the other, in the direction of the longitudinal axis of the baffle plate;*

*wherein the crease of a plurality of tabs in each row of tabs being directly downstream with respect to the flow of the heating fluid of the creases of the tabs in the rows of tabs directly upstream and being directly upstream of the creases of the tabs in the row of tabs directly downstream; and*

*the baffle plate with its tab/hole pairs and webs is positioned within the conduit and shaped so that the tabs are capable of deflecting the heating fluid and the heating fluid is flowable (1) through the holes, (2) between the tabs, (3) adjacent to the webs and (4) between the tabs and the heat transfer conduit so the baffle plate, tabs, and holes are capable of collectively causing increased turbulence in the heating fluid passing through the heat transfer conduit to improve heat transfer from the heating fluid through the heat transfer conduit to the shortening within the vat of the deep fryer system as compared to a similar heat exchanger for a deep fryer system which does not utilize a baffle plate.*

*43. A heat tube baffle for a deep fat fryer wherein the fryer includes an oil tank for cooking food with at least one heat tube extending therethrough in heat exchange relationship with said tank wherein cooking oil in said tank is heated by said tube and wherein a burner generates products of combustion which flow through said tube from an entrance to an exit, said baffle comprising:*

*an elongated, rectangular metal plate having opposed faces, the plate disposed within the tube and extending*

*within the tube, the plate having a plurality of mutually spaced tabs struck thereof, in mutually spaced rows and extending at an acute angle to the plate along the length thereof, each of the tabs in each row extending outwardly toward an adjacent tube wall and directed upstream of the flow, each struck tab leaving a corresponding hole in the plate whereby products of combustion in the flow are directed through the hole by the tab.*

* * * * *